(12) United States Patent
Yamaguchi

(10) Patent No.: US 9,322,456 B2
(45) Date of Patent: Apr. 26, 2016

(54) ELECTRIC POWER STEERING DEVICE

(71) Applicant: JTEKT CORPORATION, Osaka-shi, Osaka (JP)

(72) Inventor: Masashi Yamaguchi, Toyota (JP)

(73) Assignee: JTEKT CORPORATION, Osaka-shi (JP)

( * ) Notice: Subject to any disclaimer, the term of this patent is extended or adjusted under 35 U.S.C. 154(b) by 0 days.

(21) Appl. No.: 14/612,765

(22) Filed: Feb. 3, 2015

(65) Prior Publication Data

US 2015/0225012 A1 Aug. 13, 2015

(30) Foreign Application Priority Data

Feb. 13, 2014 (JP) .................. 2014-025501
Nov. 13, 2014 (JP) .................. 2014-230971

(51) Int. Cl.
*B62D 5/04* (2006.01)
*F16G 1/28* (2006.01)
*F16H 7/02* (2006.01)

(52) U.S. Cl.
CPC ................ *F16G 1/28* (2013.01); *B62D 5/0424* (2013.01); *F16H 7/023* (2013.01)

(58) Field of Classification Search
CPC .......... F16G 1/28; F16H 7/023; B62D 5/0424
See application file for complete search history.

(56) References Cited

U.S. PATENT DOCUMENTS

| 4,708,700 A | 11/1987 | Abe |
| 7,278,334 B2 * | 10/2007 | Saruwatari ........... B62D 5/0412 180/444 |
| 2004/0221668 A1 | 11/2004 | Saruwatari et al. |

FOREIGN PATENT DOCUMENTS

| EP | 1 621 444 A1 | 2/2006 |
| FR | 2 853 876 A1 | 10/2004 |
| JP | S56-101239 U | 8/1981 |
| JP | 2004-314770 A | 11/2004 |
| JP | 2013203156 A * | 10/2013 |

OTHER PUBLICATIONS

Jul. 9, 2015 Extended Search Report in European Patent Application No. 15154310.5.

* cited by examiner

*Primary Examiner* — Kevin Hurley
(74) *Attorney, Agent, or Firm* — Oliff PLC

(57) ABSTRACT

An electric power steering device includes a motor, a drive pulley that is connected to the output shaft of the motor and includes helical teeth, a driven pulley that is arranged coaxially with a rack shaft and includes helical teeth, and a belt that is wound around these pulleys and includes helical teeth meshing with the respective helical teeth of both pulleys. Internal teeth on a belt each are formed to have a tooth thickness that is reduced toward both ends thereof along the width direction of the belt.

20 Claims, 8 Drawing Sheets

F I G . 3
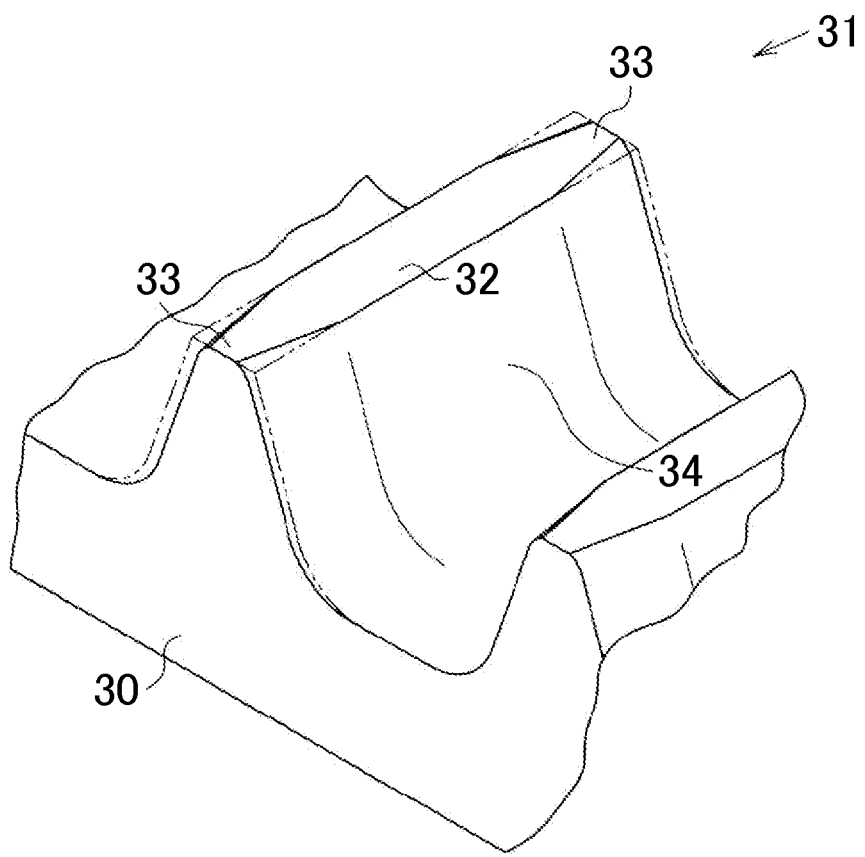

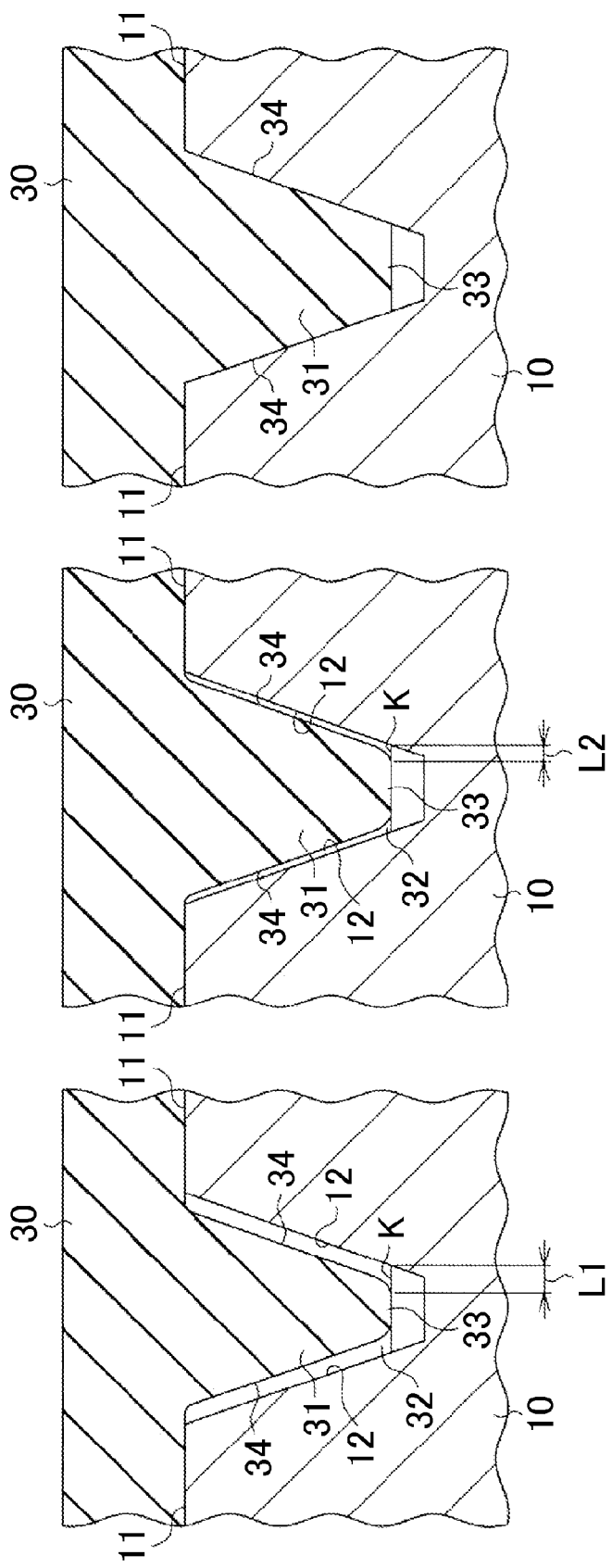

| MODEL | | DRIVE PULLEY | | DRIVEN PULLEY | |
|---|---|---|---|---|---|
| BALL SCREW | MOTOR | INCLINATION | TOOTH PROFILE | INCLINATION | TOOTH PROFILE |
| A | P1 | / | 11 — LARGE / SMALL | / | 22 — LARGE / SMALL |
| A | P2 | \ | 11 — SMALL / LARGE | \ | ← |
| B | P1 | / | 11 — LARGE / SMALL | \ | 22 — SMALL / LARGE |
| B | P2 | \ | 11 — SMALL / LARGE | \ | ← |

ELECTRIC POWER STEERING DEVICE

INCORPORATION BY REFERENCE

The disclosures of Japanese Patent Applications No. 2014-025501 and No. 2014-230971 respectively filed on Feb. 13, 2014 and Nov. 13, 2014, each including the specification, drawings and abstract, are incorporated herein by reference in their entireties.

BACKGROUND OF THE INVENTION

1. Field of the Invention

The invention relates to an electric power steering device.

2. Description of Related Art

As an electric power steering device applying assist force to a steering mechanism, an electric power steering device as disclosed in Japanese Patent Application Publication No. 2004-314770 (JP 2004-314770 A) is known. In the electric power steering device, a motor is arranged in parallel to a steered shaft and the output from the motor is applied as assist force via a transmission mechanism including one set of pulleys and a belt.

It has been generally known that, in this type of electric power steering device, an operating sound is generated when the set of pulleys and belt is operated and their teeth are meshed with each other. How to reduce such operating sound is regarded as a matter to be addressed.

For the aforementioned electric power steering device, one technical solution to reduce the operating sound is to spread the clearance between the pulley tooth and the belt tooth when they mesh with each other (referred to as "meshing clearance" hereinafter). However, if the meshing clearance between the pulleys and the belt is spread, tooth skipping may occur between the pulley teeth and the belt teeth more frequently, which is a new matter to be addressed.

SUMMARY OF THE INVENTION

One objective of the present invention is to provide an electric power steering device capable of reducing an operation sound without raising a new matter to be addressed.

An electric power steering device according to one aspect of the present invention includes a steered shaft that changes a steering angle of steered wheels responding to steering operation, a motor that applies assist force to the steered shaft, a drive pulley that includes helical teeth and is connected to an output shaft of the motor, a driven pulley that includes helical teeth and is arranged coaxially with the steered shaft, and a belt that includes helical teeth meshing with the helical teeth of a set of the drive pulley and the driven pulley, and is wound around the set of the pulleys.

The helical teeth of at least one of the pulleys and the belt each have a tooth thickness that is reduced toward both ends of the helical tooth in the width direction of the pulleys or the belt.

When the helical teeth mesh with each other between the pulleys and the belt, one end of each helical tooth is the beginning of meshing during the rotation. With the aforementioned configuration, the meshing clearance is spread between the pulleys and the belt at the beginning of the meshing between the helical teeth thereof, which are formed in such a shape that the tooth thickness that is reduced toward both ends along the width direction of the pulleys and the belt. That is, under this condition, the tooth contact is adjusted at the beginning of the tooth meshing between the pulleys and the belt to consequently reduce the operating sound. However, if the meshing clearance is spread along the entire width of the meshing portion on the helical tooth, tooth skipping will occur. In this configuration, except for the beginning of the tooth meshing between the pulleys and the belt, the helical teeth of the pulleys and the belt is formed in such a shape that the tooth thickness is reduced toward both ends of the helical teeth in the width direction of the pulleys and the belt. This makes it easier to maintain the meshing between the pulleys and the belt because the meshing clearance at the part other than the beginning of the tooth meshing is narrowed between the pulleys and the belt. It is thus possible to reduce the cause of the operating sound and the occurrence of tooth skipping and therefore to reduce the operating sound effectively.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein:

FIG. 3 is a schematic drawing of a tooth profile of a belt in the first embodiment;

FIG. 4A is a schematic drawing of meshing between a pulley and the belt in the first embodiment;

FIG. 4B is a schematic drawing of meshing between the pulley and the belt in the first embodiment;

FIG. 4C is a schematic drawing of meshing between the pulley and the belt in the first embodiment;

FIG. 7 is a schematic diagram of the combinations of tooth profiles in each pulley in the second embodiment.

DETAILED DESCRIPTION OF EMBODIMENTS

The following will describe a first embodiment of the present invention.

Figure 1:
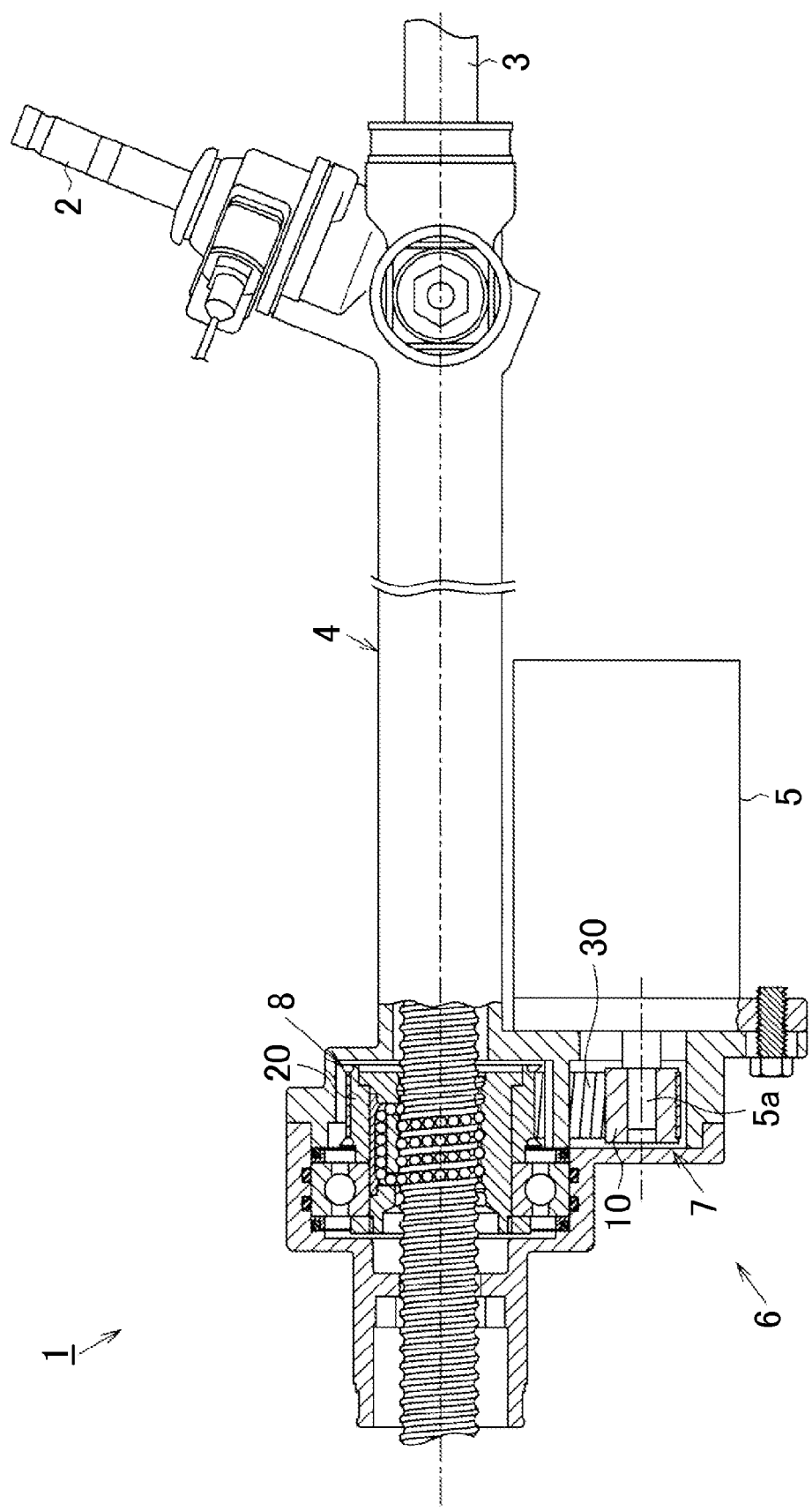
FIG. 1 is a schematic drawing of a configuration of an electric power steering device in a first embodiment.

As shown in FIG. 1, an electric power steering device 1 includes a pinion shaft 2 that rotates responding to steering operation by a driver and a rack shaft 3 serving as a steered shaft that changes the steering angle of steered wheels with linear reciprocating movement in the axial direction responding to the rotation of the pinion shaft 2. The electric power steering device 1 includes a rack housing 4 formed in a generally cylindrical shape into which the rack shaft 3 is inserted.

The rack housing 4 accommodates the pinion shaft 2, which intersects the rack shaft 3 at an angle and allowed to rotate. With the pinion gear of the pinion shaft 2 engaged with the rack gear of the rack shaft 3, a rack and pinion mechanism is configured. The pinion shaft 2 is connected with a steering shaft, to the end of which a steering wheel that is operated by the driver is fixed.

In the electric power steering device 1, when the driver executes steering operation, the rotation movement of the pinion shaft 2 is accordingly converted into linear reciprocating movement in the axial direction of the rack shaft 3 through the rack and pinion mechanism. Thus, the steering angle of the steered wheels, that is, the traveling direction of a vehicle is changed.

The electric power steering device 1 includes a steering assist device 6 that applies assist force to a steering mechanism including the pinion shaft 2, the rack shaft 3, and other components with a motor 5 arranged in parallel to the rack shaft 3 as a driving source. A transmission mechanism 7 includes a metal-made drive pulley 10 connected to an output shaft 5a of the motor 5, a metal-made driven pulley 20 arranged in parallel to the drive pulley 10 and connected to the rack shaft 3, and a rubber-made belt 30 connecting to the pulley 10 and the pulley 20 by meshing with the pulleys. Rotation torque from the output shaft 5a of the motor 5 is transmitted to the rack shaft 3 via the transmission mechanism 7. A ball screw mechanism 8 is provided between the rack shaft 3 and the driven pulley 20.

In the steering assist device 6, the rotation torque from the motor 5 is transmitted to the ball screw mechanism 8 via the transmission mechanism 7 and is subsequently converted into axial force in the axial direction of the rack shaft 3 through the ball screw mechanism 8 to apply assist force to the steering mechanism. The electric power steering device 1 in the first embodiment functions as what is called a rack-assist type electric power steering device in which the rack and the motor are arranged in parallel.

The following will describe the connecting structure between the pulleys 10 and 20 and the belt 30.

Figure 2:
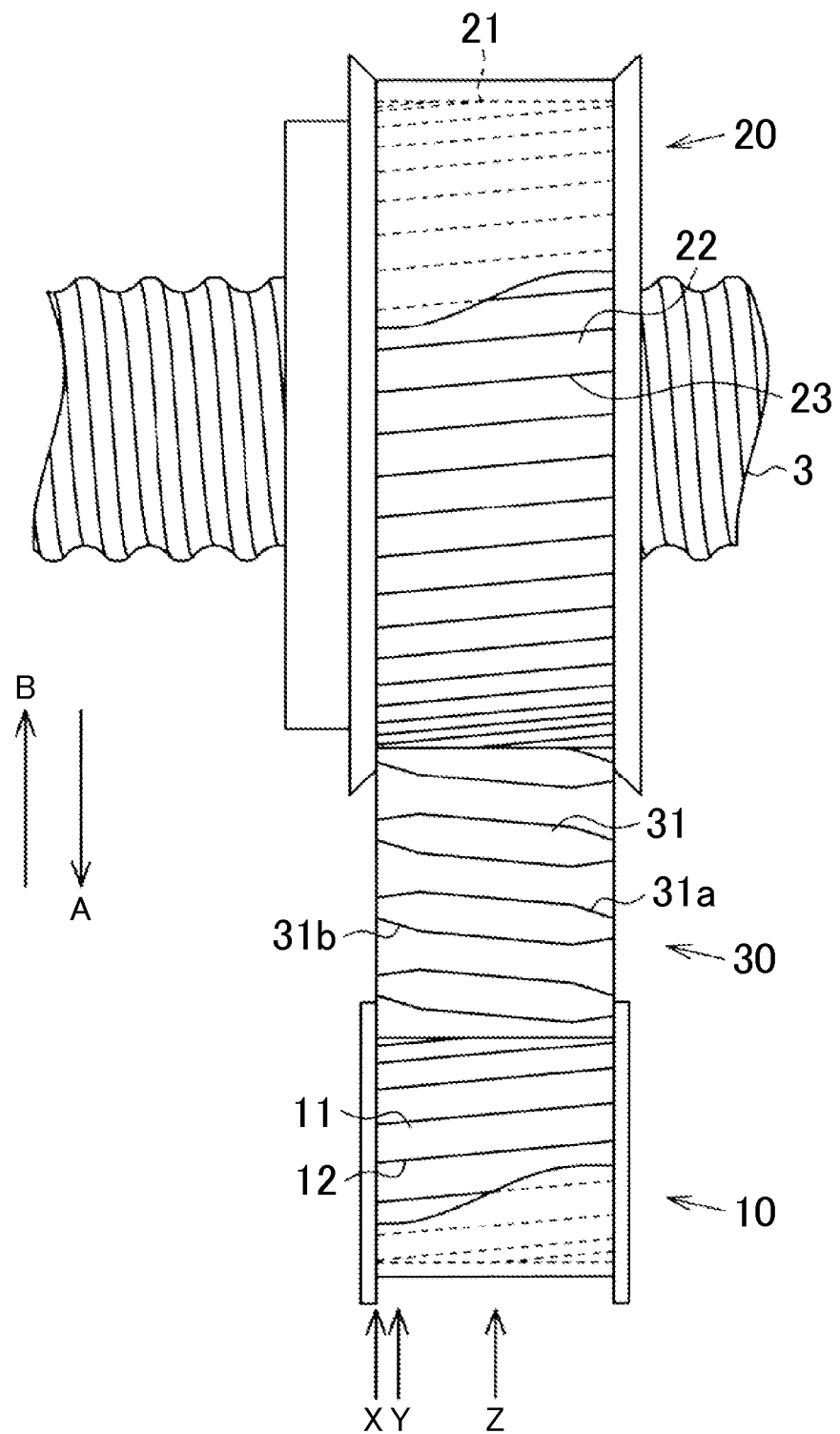
FIG. 2 is a partially sectional view of a frontal structure of a transmission mechanism in the first embodiment.

As shown in FIG. 2, the drive pulley 10 is provided with external teeth 11 protruding radially outward. The driven pulley 20 is provided with external teeth 22 protruding radially outward. The belt 30 is provided with internal teeth 31 meshing with each of the external teeth 11 of the drive pulley 10 and the external teeth 22 of the driven pulley 20. The belt 30 is wound around both the pulleys 10 and 20 such that the internal teeth 31 mesh with the external teeth 11, 22. The belt 30 is wound around the pulleys 10 and 20 in a slightly elongated state to generate a specified tension. FIG. 2 only shows the external teeth 11 and 22, and the internal teeth 31 for convenience.

As shown in FIG. 2, the external teeth 11, 22 on the pulleys 10, 20 are configured as helical teeth inclined at an angle relative to the axial direction of the rotation axis (width direction of each pulley) for the pulleys 10, 20. Helix angles of the external teeth 11, 22 are set to be equal relative to the width direction of each pulley. Furthermore, each of the external teeth 11, 22 includes an identical tooth profile along the width direction of each pulley. That is, each tooth has the same thickness both in the external teeth 11 and the external teeth 22. Also, each external tooth 11, 22 has a flank 12, 23, which meshes with a flank of each internal tooth 31 of the belt 30. The flank 12, 23 is a curved surface having a specific helix angle relative to the width direction of each pulley.

As shown in FIG. 2 and FIG. 3, the internal teeth 31 on the belt 30 are configured as helical teeth inclined at an angle relative to the axial direction of the rotation axis of the pulleys 10, 20 (width direction of the belt) when the belt 30 is engaged with the pulleys 10, 20. The helix angle of the internal teeth 31 relative to the width direction of the belt is set equal to the helix angle of the external teeth 11, 22. Each internal tooth 31 has a thickness that is reduced toward its both ends (tip ends) in the width direction of the belt. On the internal tooth 31, a center part 32 with a constant tooth thickness is provided. The internal tooth 31 has a thickness that is reduced from the center part 32 toward its both ends in the width direction of the belt. That is, the internal tooth 31 has tapered parts 33 in which the thickness is reduced. The internal tooth 31 is provided with flanks 34 that mesh with flanks of the external teeth 11, 22 on the pulleys 10, 20 at the center part 32. The flanks 34 are curved surfaces having an equal helix angle relative to the width direction of the belt. The flank 34 is inclined, at the tapered part 33, at an angle relative to a portion of the flank 34 at the center part 32 along the width direction of the belt. The tapered parts 33 of the internal tooth 31 are configured in which the reduction ratio of the tooth thickness becomes larger from the tooth bottom toward the tip ends. The internal tooth 31 is formed such that each flank 34 has a smoothly curved contour at the changing point from the center part 32 to the tapered parts 33. Thus, the internal teeth 31 on the belt 30 each have a reduced thickness at its both ends in the width direction, compared to those of the prior arts disclosed in JP 2004-314770 A, for example, as indicated by imaginary lines in FIG. 3.

How the teeth meshes with each other between the pulleys 10, 20 and the belt 30 will be described, with the meshing between the drive pulley 10 and the belt 30 used as an example.

When the external teeth 11 on the drive pulley 10 and the internal teeth 31 on the belt 30 are meshed with each other, a portion of the flank 34 at the center part 32 of the internal tooth 31 is specifically in contact with the flank 12 of the external tooth 11.

As shown in FIG. 4A, the flank 34 at the end of the tapered part 33 in the internal tooth 31 along the width direction of the belt and the flank 12 of the external tooth 11 face each other at the end portion of the meshing between the internal tooth 31 and the external tooth 11 (denoted by X in FIG. 2). Since the tooth thickness at the tapered part 33 is smaller than that at other portions such as the center part 32, there is a clearance K with a length L1 formed between the meshing teeth at the end of the internal tooth 31 and the external tooth 11. This clearance K is formed at both ends of the internal tooth 31 and the external tooth 11 in the width direction of the belt and the drive pulley.

As shown in FIG. 4B, the flank 34 of the internal tooth 31 at an intermediate part of the tapered part 33 in the width direction of the belt and the flank 12 of the external tooth 11 face each other slightly inside from the end portion of the meshing between the internal tooth 31 and external tooth 11 (denoted by Y in FIG. 2). At the intermediate part of the tapered part 33, there is a clearance K with a length L2, which is shorter than the length L1 (L2<L1), formed between the internal tooth 31 and the external tooth 11 because the tooth thickness is reduced gradually toward the ends. This clearance K is formed at intermediate sections from the center to both ends of the internal tooth 31 and the external tooth 11 in the width direction of the belt and the drive pulley.

As shown in FIG. 4C, at the center portion of meshing between the internal tooth 31 and the external tooth 11 (denoted by Z in FIG. 2), the amount of the clearance K is approximately 0 (zero) due to the contact between the flank 34 at the center part 32 of the internal tooth 31 and the flank 12 of the external tooth 11. Thus, there is a portion with the clearance K of approximately 0 formed along the center portion of the meshing between the internal tooth 31 and the external tooth 11.

Along the meshing between the internal tooth 31 and the external tooth 11, the clearance K is configured to increase from the meshing center portion toward both ends in the width direction of the belt and the drive pulley (clearance K at both ends > clearance K inside of both ends > clearance K at the center part). This configuration is also applied to the meshing between the internal tooth 31 of the belt 30 and the external tooth 22 of the driven pulley 20.

For example, while the belt 30 on the further side in FIG. 2 is moving in the direction A, an upper right part 31a of the internal tooth 31, that is, the right-hand part on the forward side in the direction of movement, is the beginning of the meshing with the external tooth 11 on the pulley 10 and the external tooth 22 on the pulley 20. Whereas, while the belt 30 on the further side in FIG. 2 is moving in the direction A, a lower left part 31b of the internal tooth 31, that is, the left-hand part on the backward side in the direction of movement, is the end of the meshing with the external tooth 11 on the pulley 10 and the external tooth 22 on the pulley 20.

While the belt 30 on the further side in FIG. 2 is moving in the direction B, the lower left part 31b of the internal tooth 31, that is, the left-hand part on the forward side in the direction of movement, is the beginning of meshing with the external tooth 11 on the pulley 10 and the external tooth 22 on the pulley 20. Whereas, while the belt 30 on the further side in FIG. 2 is moving in the direction B, the upper right part 31a of the internal tooth 31, that is, the right-hand part on the forward side in the direction of movement, is the end of meshing with the external tooth 11 on the pulley 10 and the external tooth 22 on the pulley 20.

Thus, as shown in FIG. 4A to FIG. 4C, the meshing clearance K becomes largest at the beginning of the meshing between the internal tooth 31 and the external teeth 11, 22 during the movement of the belt 30 regardless of the moving direction. When the internal tooth 31 and the external teeth 11, 22 continue to mesh with each other, the meshing clearance K becomes smaller gradually along the tapered part 33 of the internal tooth 31. Later on, the internal tooth 31 and the external teeth 11, 22 continue further to mesh with each other and then, at the center part 32 of the internal tooth 31, the meshing clearance K becomes even smaller and then is kept constant along the center part 32. The internal tooth 31 and the external teeth 11, 22 continue further to mesh with each other, the meshing clearance K becomes larger again and then becomes largest at the end of the meshing between the internal tooth 31 and the external teeth 11, 22.

The following will describe the actions of the electric steering device 1.

When the teeth mesh with each other between the pulleys 10, 20 and the belt 30, one end of each tooth is the beginning of the meshing. At the beginning of the meshing through the internal teeth 31 on the belt 30 with a tooth thickness reduced toward both ends along the width direction of the belt, the clearance K becomes largest. That is, the tooth contact is adjusted at the beginning of the meshing between the pulleys 10, 20 and the belt 30 to consequently reduce the generation of the operating sound. If the meshing clearance K is widened along the entire width of each meshing tooth, there will occur tooth skipping. In the internal teeth 31 on the belt 30, the tooth thickness is reduced toward both ends in the width direction of the belt such that the meshing clearance K becomes smaller at the part other than the beginning of the meshing between the pulleys 10, 20 and the belt 30 especially at the center part of the meshing than that at the beginning of the meshing. This makes it easier to maintain the tooth meshing between the pulleys 10, 20 and the belt 30. In the first embodiment, the internal teeth 31 on the belt 30 are configured to have a tooth thickness that is reduced toward both ends in the width direction of the belt.

At the center part 32 of the internal tooth 31 on the belt 30, where the meshing clearance K is kept constant, the occurrence of tooth skipping can be reduced because the small meshing clearance K is maintained.

As described above in the first embodiment, the advantageous effects will be obtained as follows.

(1) When the internal teeth 31 on the belt 30 and the external teeth 11, 22 on the pulleys 10, 20 are meshed, the tooth contact is adjusted at the beginning of the meshing of the teeth, whereby the generation of the operating sound is reduced and the meshing of the teeth is easily maintained especially at the center portion of the meshing. It is thus possible to reduce the operation sound and the occurrence of tooth skipping.

(2) At the center portion of the meshing between the belt 30 and the pulleys 10, 20, a state in which the clearance K is kept small is maintained. This can reduce the occurrence of tooth skipping.

(3) For the internal teeth 31 on the belt 30, the tooth thickness is reduced toward both ends in the width direction of the belt to consequently reduce the operating sound. There is no need to process the pulleys 10, 20, which can reduce the processing costs.

(4) When the belt 30 and the pulleys 10, 20 are meshed, both ends of each tooth in the width direction of the belt and the pulleys at the beginning of the meshing can also be the end of the meshing. At the end of meshing, the tooth contact is adjusted to reduce the generation of the operating sound.

The following will describe an electric power steering device according to a second embodiment. For example, the same configurations and controls described in the first embodiment are denoted with the same numerals and descriptions thereof will be omitted.

Figure 5C:
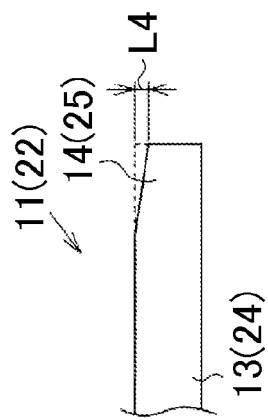
FIG. 5C is a schematic drawing of a tooth profile of the pulley in the second embodiment.
Figure 5B:
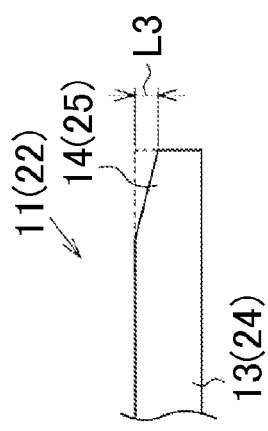
FIG. 5B is a schematic drawing of a tooth profile of the pulley in the second embodiment.
Figure 5A:
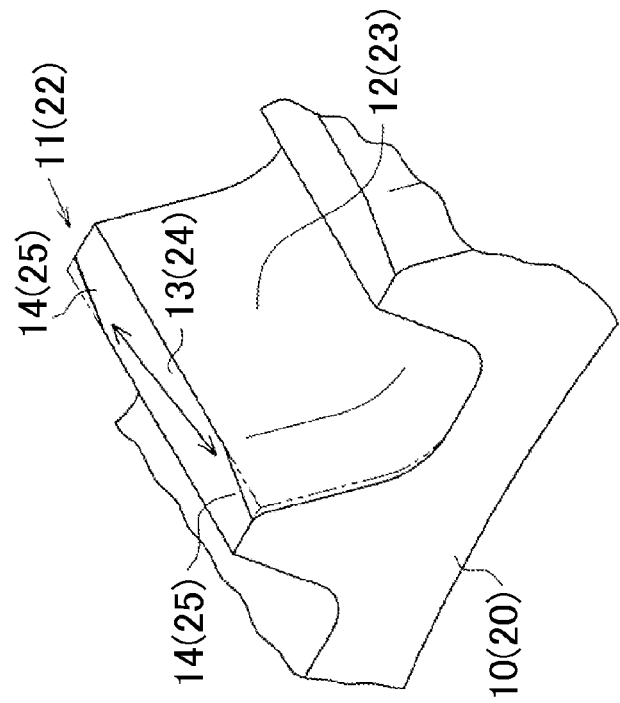
FIG. 5A is a schematic drawing of a tooth profile of the pulley in a second embodiment.

As shown in FIG. 5A, in the external teeth 11, 22 on the pulleys 10, 20 in the second embodiment, the tooth thickness is reduced from the center part toward both ends in the width direction of each pulley. On the external teeth 11, 22, the center parts 13, 24 are formed, respectively, having a constant tooth thickness, and the tooth thickness is reduced from each center part 13, 24 toward both ends in the width direction of each pulley, that is, tapered parts 14, 25 with reduced tooth thickness are formed. These tapered parts 14 and 25 are formed by machining process in which one side of each end of each external tooth 11, 22 in the width direction of the pulleys is cut such that the cut sides are arranged diagonally opposite from each other. The tapered parts 14 and 25 are formed by cutting a side of the beginning of the meshing between the internal teeth 31 on the belt 30 and the external teeth 11, 22 on the pulleys 10, 20, that is, a side inclined to the forward direction of the movement, considering the inclining direction and the rotation direction of the helical teeth (upper right and lower left portions on the nearer side in FIG. 2). The external teeth 11, 22 are formed such that the flanks 12, 23 have smoothly curved contours at the changing point from the center parts 13, 24 to the tapered parts 14 and 25.

The tooth thickness of the internal teeth 31 on the belt 30 is kept constant. The flanks 12, 23 are formed as curved surfaces having an equal helix angle relative to the width direction of the belt.

As shown in FIG. 5B and FIG. 5C, the tapered parts 14, 25 are formed such that the length of the tip ends is L3, or such that the length of the tip ends is L4, which is shorter than L3

(L4<L3), so as to make a gradient toward the tip ends larger. Therefore, in a case where the length of the tip ends of the tapered parts 14, 25 is L3 (referred to as "small gradient" hereinafter), the meshing clearance K between the internal tooth 31 and the external teeth 11, 22 is widened compared with that in a case where the length is L4 (referred to as "large gradient" hereinafter) while the belt 30 is moving.

In the second embodiment, the external teeth 11, 22 on the pulleys 10, 20 are machined to set the meshing clearance K between the helical teeth of the pulleys 10, 20 and the belt 30, depending on the model for the transmission mechanism 7 of the electric power steering device 1.

As shown in FIG. 6A to FIG. 6D, it is possible to assume multiple models for the transmission mechanism 7 of the electric power steering device 1 (four models presented in the second embodiment) depending on the supporting method for the ball screw mechanism 8 on which the driven pulley 20 is arranged (categorized by A and B) and the supporting method for the drive motor 5 on which the drive pulley 10 is arranged (categorized by P1 and P2).

More specifically, it is possible to assume a supporting method A by which the ball screw mechanism 8 is supported on the rack housing 4 by a supporting member B1 such as a bearing on the opposite side of the belt 30 from the pinion shaft 2, and a supporting method B by which the ball screw mechanism 8 is supported on the rack housing 4 by the supporting member B1 on the same side of the belt 30 as the pinion shaft 2. In addition, it is possible to assume a supporting method P1 by which the drive motor 5 is supported on the rack housing 4 by a supporting member B2 such as bolts on the same side of the belt 30 as the pinion shaft 2, and a supporting method P2 by which the drive motor 5 is supported on the rack housing 4 by the supporting member B2 on the opposite side of the belt 30 from the pinion shaft 2.

As shown in FIG. 7, by the relationship between the tension of the belt 30 and the supporting methods for the ball screw mechanism 8 and the drive motor 5, the ball screw mechanism 8 on which the driven pulley 20 is arranged or the drive motor 5 on which the drive pulley 10 is arranged can be tilted. According to the tilting angle thereof, the meshing between the internal teeth 31 of the belt 30 and the external teeth 11, 22 of the pulleys 10, 20 can also be tilted. For the description below, directions are defined based on the external teeth 11, 22 on the nearer side in FIG. 2, that is, helical teeth inclined upward toward the right with the upper right and lower left portions cut.

Figure 6A:
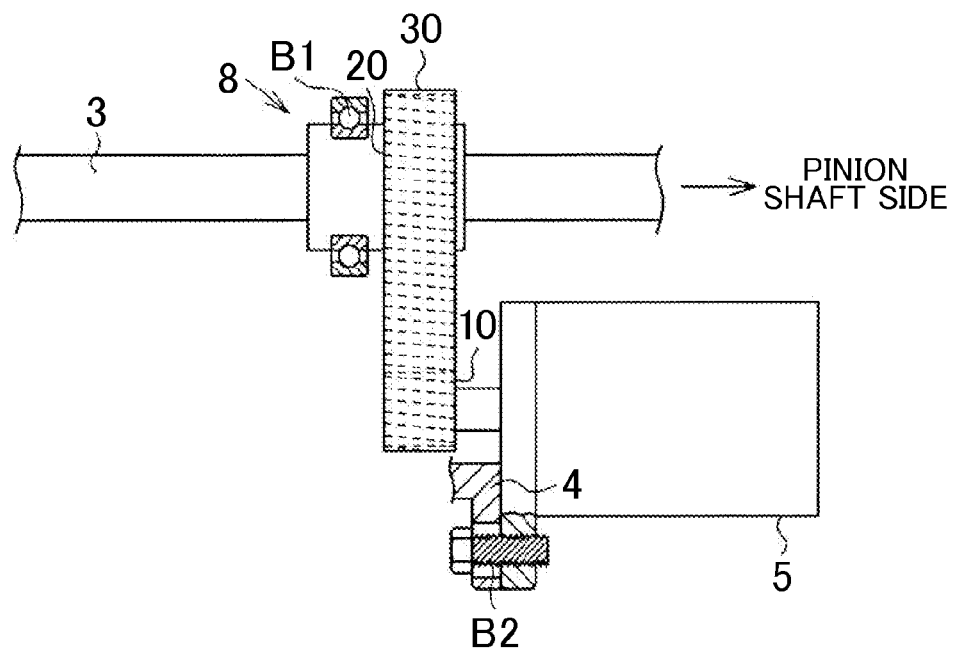
FIG. 6A is a drawing of a modeling example of the electric power steering device in the second embodiment.

As shown in FIG. 6A, in the A/P1 model, or the combination of the supporting method A and the supporting method P1, the ball screw mechanism 8, namely, the driven pulley 20, is tilted toward the side opposite from the supporting member B1 and toward the drive motor 5 (toward the lower right in FIG. 6A). The drive motor 5, namely, the drive pulley 10, is tilted toward the side opposite from the supporting member B2 and toward the ball screw mechanism 8 (toward the upper left in FIG. 6A).

As shown in the row of the A/P1 model in FIG. 7, for this combination model, the tooth profile of the external teeth 11 on the drive pulley 10 is preferably configured such that the portion where the drive pulley 10 is not supported, that is, the tapered part 14 on the left-hand side has a large gradient, and the portion where the drive pulley 10 is supported, that is, the tapered part 14 on the right-hand side has a small gradient. In this case, the tooth profile of the external teeth 22 on the driven pulley 20 is also preferably configured such that the portion where the driven pulley 20 is supported, that is, the tapered part 25 on the left-hand side, has a small gradient, and the portion where the driven pulley 20 is not supported, that is, the tapered part 25 on the right-hand side has a large gradient.

Figure 6B:
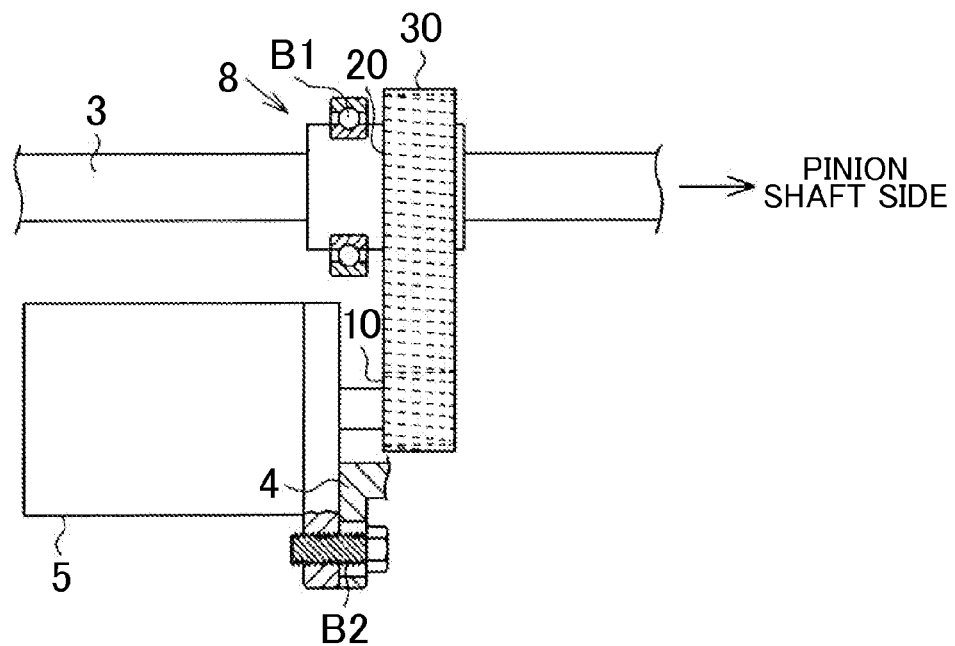
FIG. 6B is a drawing of a modeling example of the electric power steering device in the second embodiment.

As shown in FIG. 6B, for the A/P2 model, or the combination of the supporting method A and supporting method P2, the ball screw mechanism 8, namely, the driven pulley 20, is tilted toward the side opposite from the supporting member B1 and toward the drive motor 5 (toward the lower right in FIG. 6B). The drive motor 5, namely, the drive pulley 10, is tilted toward the side opposite from the supporting member B2 and toward the ball screw mechanism 8 (toward the upper right in FIG. 6B).

As shown in the row of the A/P2 model in FIG. 7, for this combination model, the tooth profile of the external teeth 11 on the drive pulley 10 is preferably configured such that the portion where the drive pulley 10 is supported, that is, the tapered part 14 on the left-hand side, has a small gradient, and the portion where the drive pulley 10 is not supported, that is, the tapered part 14 on the right-hand side has a large gradient. In this case, the tooth profile of the external teeth 22 on the driven pulley 20 is preferably configured as for the A/P1 model.

Figure 6C:
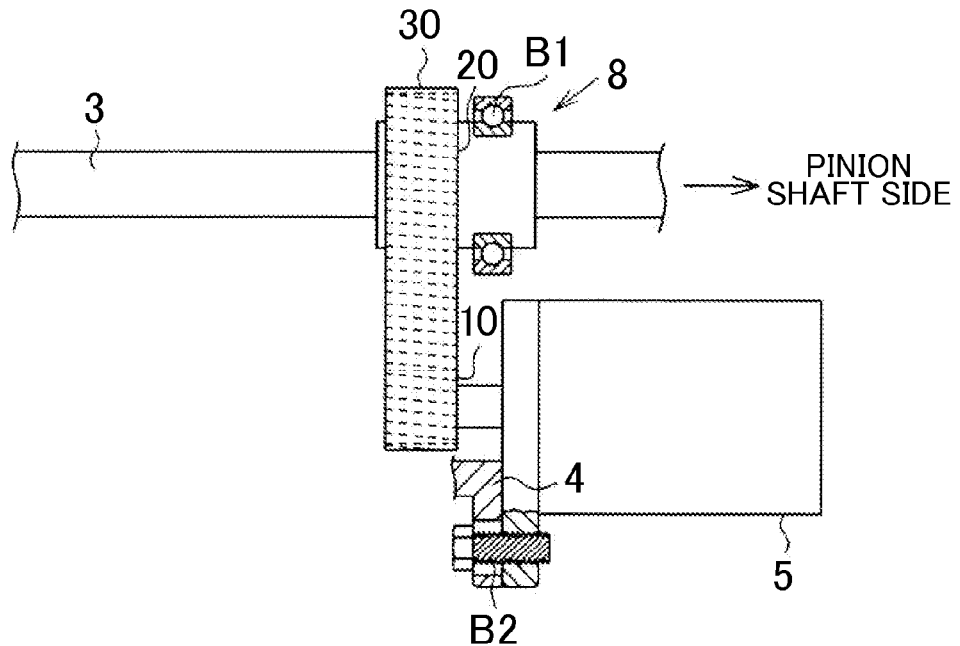
FIG. 6C is a drawing of a modeling example of the electric power steering device in the second embodiment.

As shown in FIG. 6C, for the B/P1 model, or the combination of the supporting method B and the supporting method P1, the ball screw mechanism 8, namely, the driven pulley 20, is tilted toward the side opposite from the supporting member B1 and toward the drive motor 5 (toward the lower left in FIG. 6C). The drive motor 5, namely, the drive pulley 10, is tilted toward the side opposite from the supporting member B2 and toward the ball screw mechanism 8 (toward the upper left in FIG. 6C).

As shown in the row of the B/P1 in FIG. 7, for this combination model, the tooth profile of the external teeth 11 on the drive pulley 10 is preferably configured such that the portion where the drive pulley 10 is not supported, that is, the tapered part 14 on the left-hand side, has a large gradient, and the portion where the drive pulley 10 is supported, that is, the tapered part 14 on the right-hand side, has a small gradient. In this case, the tooth profile of the external teeth 22 on the driven pulley 20 is preferably configured such that the portion where the driven pulley 20 is not supported, that is, the tapered part 25 on the left-hand side has a large gradient, and at the same time, the portion where the driven pulley 20 is supported, that is, the tapered part 25 on the right-hand side, has a small gradient.

Figure 6D:
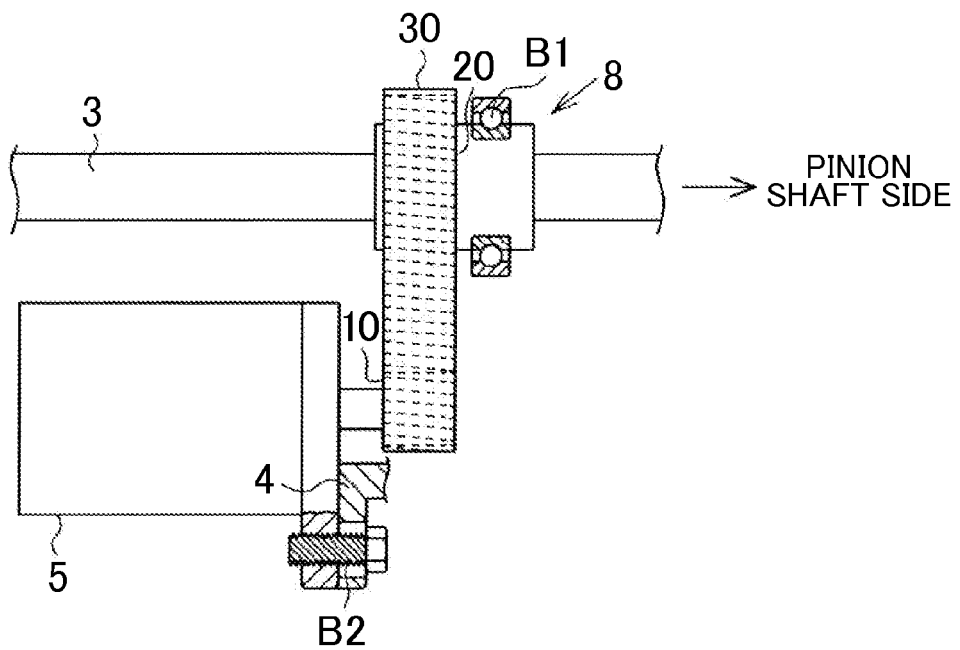
FIG. 6D is a drawing of a modeling example of the electric power steering device in the second embodiment.

As shown in FIG. 6D, for the B/P2 model, or the combination of the supporting method B and the supporting method P2, the ball screw mechanism 8, namely, the driven pulley 20, is tilted toward the side opposite from the supporting member B1 and toward the drive motor 5 (toward the lower left in FIG. 6D). The drive motor 5, namely, the drive pulley 10, is tilted toward the side opposite from the supporting member B2 and toward the ball screw mechanism 8 (toward the upper right in FIG. 6D).

As shown in the row of the B/P2 in FIG. 7, for this combination model, the tooth profile of the external teeth 11 on the drive pulley 10 is preferably configured such that the portion where the drive pulley 10 is supported, that is, the tapered part 14 on the left-hand side, has a small gradient, and the portion where the drive pulley 10 is not supported, that is, the tapered part 14 on the right-hand side, has a large gradient. In this case, the tooth profile of the external teeth 22 on the driven pulley 20 is preferably configured as for the B/P1 model.

As mentioned above, by applying preferable configurations to the assumed combination models, the meshing clearance K between the internal teeth 31 and the external teeth 11 is widened on the opposite side from the supporting member B2, that is, the side on which the drive pulley 10 is not supported, compared with that on the same side as the supporting member B2, that is, the side on which the drive pulley 10 is supported. The meshing clearance K between the internal teeth 31 and the external teeth 22 is widened on the opposite side from the supporting member B1, that is, the portion where the driven pulley 20 is not supported, compared with that on the same side as the supporting member B1, that is, the side on which the driven pulley 20 is supported.

The following will describe the actions of the electric power steering device 1 in the second embodiment.

When the driven pulley 20 and the drive pulley 10 are independently tilted as seen in the assumed combination models in the second embodiment, if the tilting angles of the driven pulley 20 and the drive pulley 10 are not taken into consideration in relation to the external teeth 11, 22, the meshing clearance K in the meshing between the internal tooth 31 and the external teeth 11, 22 will be smaller than it is expected even if the tooth thickness is reduced toward both ends along the width direction of each pulley.

In the second embodiment, the tooth thickness of the external teeth 11, 22 on the pulley 10 and the pulley 20 is reduced toward both ends in the width direction of each pulley considering the tilting angles of the driven pulley 20 and the drive pulley 10, thereby reducing the operating sound.

In the second embodiment focusing on the beginning of the meshing between the pulleys 10, 20 and the belt 30, only a single flank of each helical tooth needs to be considered in relation to the inclining direction of the helical tooth and the rotation direction. That is, in the external teeth 11, 22 on the pulleys 10, 20, portions where the tooth thickness is reduced toward both ends in the width direction of each pulley can be minimized. It is thus possible, in the pulleys 10, 20 and the belt 30, to secure as large a portion of each tooth as possible where the meshing clearance K is small.

As described above, the second embodiment will ensure the following advantageous effects as well as the effects (1) to (3) in the aforementioned first embodiment.

(4) For the external teeth 11, 22 on the pulleys 10, 20, the tooth thickness is reduced toward both ends in the width direction of each pulley so as to provide a device for reducing the operating sound to each of the pulley 10 and the pulley 20 while providing a preferable meshing clearance.

(5) For the external teeth 11 and 22 on the pulleys 10, 20, portions where the tooth thickness is reduced toward both ends in the width direction of each pulley can be minimized. This makes it easier to secure a portion where the meshing clearance K between the teeth on the pulleys 10, 20 and the belt 30 is narrowed, whereby the occurrence of tooth skipping can be reduced.

Each embodiment described above may also be applicable in other modes by making appropriate modifications as follows.

In the first embodiment, the tapered parts 33 of the internal tooth 31 may be formed by cutting one side of each end of each tooth in the width direction of the belt such that the cut sides are arranged diagonally opposite from each other considering only the beginning of the meshing between both pulleys 10 and 20 and the belt 30.

In the first embodiment, the tip ends of the internal tooth 31 may have a gradient considering the models for the transmission mechanism 7 of the electric power steering device 1, as in the second embodiment. In this case, the gradient to be applied to the tip ends of the internal tooth 31 may be set considering the meshing with the pulley whose tilting angle is larger in the aforementioned models.

The first embodiment may be realized with the internal tooth 31 having a barrel-like shape as a whole with a configuration where the tooth thickness of the center part 32 of the internal tooth 31 in the width direction of the belt is largest at the center portion of the internal tooth 31 and the tooth thickness is reduced gradually toward both ends in the width direction of the belt.

In the second embodiment, the tapered parts 14 and 25 of each of the external teeth 11 and 22 may be formed by cutting both sides of each end in the width direction of each pulley, considering the end of the meshing between the pulleys 10, 20 and the belt 30. In this case, as in the beginning of the meshing between the pulley 10, 20 and the belt 30, the ends of the external tooth can be tapered considering the model for the transmission mechanism 7 of the electric power steering device 1.

In the second embodiment, the ends of the external tooth on either one of the pulleys 10, 20 may be tapered. That is, the ends of the external tooth on the pulley whose tilting angle is larger during meshing can be tapered, considering the meshing with the pulley whose tilting angle is larger in the aforementioned models. With this configuration, a device is provided to at least one of the external-toothed pulleys 10 and 20 so that the operating sound is reduced compared to the case where no device is provided.

The second embodiment may be realized with the external teeth 11, 22 having an approximately barrel-like shape as a whole with a configuration in which at the portion where the tip ends of each of the external teeth 11, 22 are tapered, the tooth thickness at each center part 13, 24 along the width direction of each pulley becomes largest at the center of each of the external teeth 11, 22, whereas the tooth thickness is reduced gradually toward both ends along the width direction of each pulley.

In each embodiment, to taper the tip ends of the helical tooth on the pulleys 10, 20 and the belt 30, the tapering process may not be applied to every helical tooth. For example, it is acceptable to apply the tapering process to every two or three teeth.

In each embodiment, the supporting methods for the ball screw mechanism 8 and the supporting methods for the drive motor 5 are exemplified as a cantilever-supporting model, but may also be applicable to a double-supporting model.

In each embodiment, the tip ends of the helical tooth on the pulleys 10, 20 and the belt 30 may be tapered with a curvature. In the second embodiment, especially, it is acceptable to adjust the amount of the meshing clearance K with a curvature.

What is claimed is:
1. An electric power steering device comprising:
a steered shaft that changes a steering angle of steered wheels responding to steering operation;
a motor that applies assist force to the steered shaft;
a drive pulley that includes helical teeth and is connected to an output shaft of the motor;
a driven pulley that includes helical teeth and is arranged coaxially with the steered shaft; and
a belt that includes helical teeth meshing with the helical teeth of a set of the drive pulley and the driven pulley, and is wound around the set of the pulleys,
wherein:
the helical teeth of at least one of the pulleys and the belt each have a first end, an opposite second end having a thickness smaller than that of the first end, and a center region therebetween in the width direction of the at least one of the pulleys and the belt, and
the helical teeth of the at least one of the pulleys and the belt each have a tooth thickness that is reduced from the center region toward the first end and from the center region toward the second end.

2. The electric power steering device according to claim 1, wherein the helical teeth of the at least one of the pulleys and the belt each have a portion where the tooth thickness is kept constant between the first end and the second end of the helical tooth in the width direction.

3. The electric power steering device according to claim 1, wherein the helical teeth of the at least one of the pulleys and the belt are the helical teeth of the belt.

4. The electric power steering device according to claim 1, wherein the helical teeth of the at least one of the pulleys and the belt are the helical teeth of at least one of the pulleys.

5. The electric power steering device according to claim 1, wherein the helical teeth of the at least one of the pulleys and the belt are the helical teeth of both of the pulleys.

6. The electric power steering device according to claim 4, wherein the helical teeth of the at least one of the pulleys and the belt each have portions formed by cutting the tooth at both ends in the width direction and located diagonally to each other.

7. The electric power-steering device according to claim 1, wherein:
the first end tooth thickness is formed by a single, first angled cut at a first lateral side of the tooth extending from the center region to the first end without forming another cut at the first end at a second lateral side of the tooth opposite to the first lateral side in the thickness direction of the tooth, and
the second end tooth thickness is formed by a single, second angled cut at the second lateral side of the tooth extending from the center region to the second end without forming another cut at the second end on the opposite first lateral side of the tooth.

8. The electric power steering device according to claim 7, wherein the first angled cut at the first end is located diagonally to the second angled cut at the second end.

9. The electric power-steering device according to claim 1, wherein:
at least one of the drive pulley and the driven pulley is supported at a first side in the width direction of the at least one of the drive pulley and the driven pulley, and is unsupported at a second side opposite to the first side in the width direction;
the at least one of the pulleys and the belt includes the at least one of the drive pulley and driven pulley; and
the second end tooth thickness is located at the unsupported second side of the at least one of the drive pulley and driven pulley to provide greater mesh clearance with the helical teeth of the belt on the unsupported second side.

10. The electric power-steering device according to claim 9, wherein:
the first end tooth thickness is formed by a single, first angled cut at a first lateral side of the tooth extending from the center region to the first end without forming another cut at the first end at a second lateral side of the tooth opposite to the first lateral side in the thickness direction of the tooth, and
the second end tooth thickness is formed by a single, second angled cut at the second lateral side of the tooth extending from the center region to the second end without forming another cut at the second end on the opposite first lateral side of the tooth.

11. The electric power-steering device according to claim 10, wherein the first angled cut is angled at a first angle from a longitudinal axis of the helical tooth, and the second angled cut is angled at a second angle from the longitudinal axis of the helical tooth, the second angle being larger than the first angle.

12. The electric power-steering device according to claim 11, wherein:
the drive pulley is supported at a first side in the width direction of the drive pulley and is unsupported at a second side opposite to the first side in the width direction;
the at least one of the pulleys and the belt includes the drive pulley; and
the second end tooth thickness and the second angled cut are located at the unsupported second side of the drive pulley to provide greater mesh clearance with the helical teeth of the belt.

13. An electric power steering device comprising:
a steered shaft that changes a steering angle of steered wheels responding to steering operation;
a motor that applies assist force to the steered shaft;
a drive pulley that includes helical teeth and is connected to an output shaft of the motor;
a driven pulley that includes helical teeth and is arranged coaxially with the steered shaft; and
a belt that includes helical teeth meshing with the helical teeth of a set of the drive pulley and the driven pulley, and is wound around the set of the pulleys,
wherein:
in the meshing of the helical teeth of at least one of the pulleys with the helical teeth of the belt,
a first clearance is formed between a tooth of the belt and an adjacent tooth of the at least one of the pulleys at a first end in a width direction of the pulleys and the belt,
a second clearance is formed between the tooth of the belt and the adjacent tooth of the at least one of the pulleys at a second end opposite to the first end in the width direction, and
the second clearance is larger than the first clearance.

14. The electric power steering device according to claim 13, wherein the helical teeth of the at least one of the pulleys and the belt each have portions formed by cutting the tooth at both ends in the width direction and located diagonally to each other.

15. The electric power-steering device according to claim 13, wherein:
the at least one of the pulleys is supported on a first side in the width direction and unsupported on a second side opposite to the first side in the width direction;
the first clearance is located at the supported first side; and
the larger, second clearance is located at the unsupported second side to provide greater mesh clearance on the unsupported side with the helical teeth of the belt.

16. The electric power-steering device according to claim 13, wherein:
each of the helical teeth of the at least one of the pulleys has a first end, an opposite second end having a thickness smaller than that of the first end to form the larger second clearance, and a center region therebetween in the width direction;
each of the helical teeth of the at least one of the pulleys has a thickness that is reduced from the center region toward the first end and from the center region toward the second end.

17. The electric power-steering device according to claim 16, wherein:
the first end tooth thickness is formed by a single, first angled cut at a first lateral side of the tooth extending from the center region to the first end without forming another cut at the first end at a second lateral side of the tooth opposite to the first lateral side in the thickness direction of the tooth, and the second end tooth thickness is formed by a single, second angled cut at the second lateral side of the tooth extending from the center region to the second end without forming another cut at the second end at the opposite first lateral side of the tooth.

18. The electric power steering device according to claim 17, wherein the first angled cut at the first end is located diagonally to the second angled cut at the second end.

19. The electric power-steering device according to claim 17, wherein the first angled cut is angled at a first angle from a longitudinal axis of the helical tooth, and the second angled cut is angled at a second angle from the longitudinal axis of the helical tooth, the second angle being larger than the first angle.

20. The electric power-steering device according to claim 17, wherein:

the drive pulley is supported at a first side in the width direction and is unsupported at a second side opposite to the first side in the width direction;

the at least one of the pulleys includes the drive pulley; and the second end tooth thickness is located at the unsupported second side of the drive pulley to provide greater mesh clearance with the helical teeth of the belt at the unsupported second side.

\* \* \* \* \*